United States Patent [19]

Phillips, II

[11] Patent Number: 5,294,223
[45] Date of Patent: Mar. 15, 1994

[54] SELF-CLINCHING FASTENER FOR ELECTRICAL COMPONENTS

[75] Inventor: Ronald W. Phillips, II, Sellersville, Pa.

[73] Assignee: Penn Engineering & Manufacturing Corp., Danboro, Pa.

[21] Appl. No.: 995,881

[22] Filed: Dec. 23, 1992

[51] Int. Cl.⁵ .................. F16B 13/04; F16B 37/04
[52] U.S. Cl. ........................ 411/34; 411/113; 411/183; 411/967
[58] Field of Search .................. 411/34–38, 411/43, 55, 105, 113, 183, 281, 433, 967, 969

[56] References Cited

U.S. PATENT DOCUMENTS

| | | | |
|---|---|---|---|
| 2,359,031 | 9/1944 | Goshia | 411/967 X |
| 2,914,106 | 11/1959 | Boyd | 411/967 X |
| 3,215,026 | 11/1965 | Davis | 411/34 |
| 3,322,449 | 5/1967 | Becker | 411/34 X |
| 3,948,142 | 4/1976 | McKay et al. | 411/967 X |
| 4,182,216 | 1/1980 | DeCaro | 411/34 |
| 4,717,612 | 1/1988 | Shackelford | 411/34 X |

Primary Examiner—Neill R. Wilson
Attorney, Agent, or Firm—Gregory J. Gore

[57] ABSTRACT

A fastener particularly suited to affixing metal to plastic parts, such as fastening electrical connectors to plastic circuit board mounting housings, includes a head and an elongate shank with an internally threaded through-bore. Located directly beneath the head is a shoulder which extends along the outside of the shank a distance equal to the total width of the parts to be joined. A mid-section of the shank is of reduced diameter, creating a thin-walled area of the shank compared with the areas at either end. A bottom part of the fastener includes internal threads, said bottom part beginning at the end of the thin-walled, mid-section of the shank. The through-bore includes a step down to a reduced diameter at the end of said mid-section. Therefore, when axially compressed, the fastener repeatedly bulges outwardly at its weakest point which lies just beyond the shoulder. The parts to be joined are thus trapped between the head and this radial bulge of the shank.

7 Claims, 2 Drawing Sheets

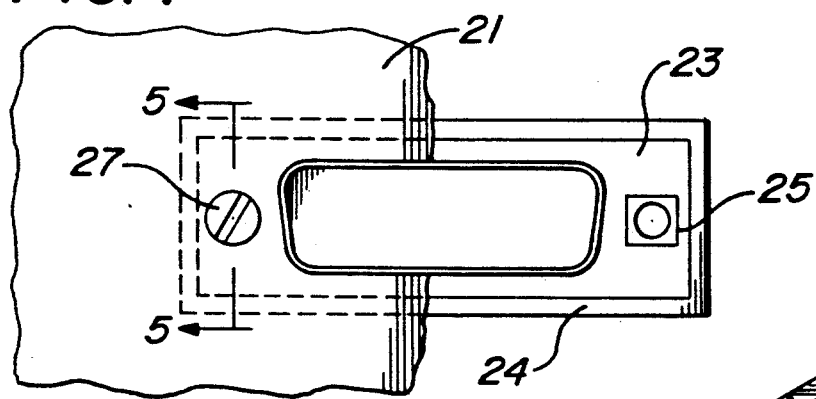
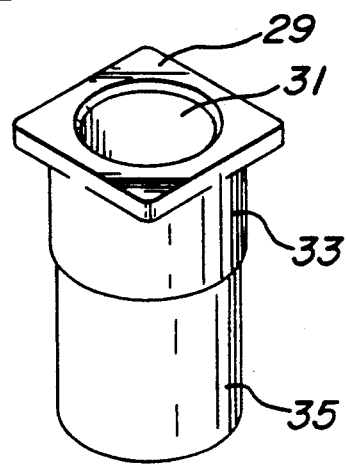
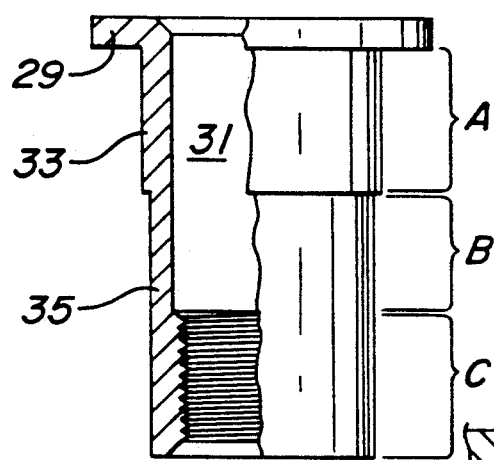
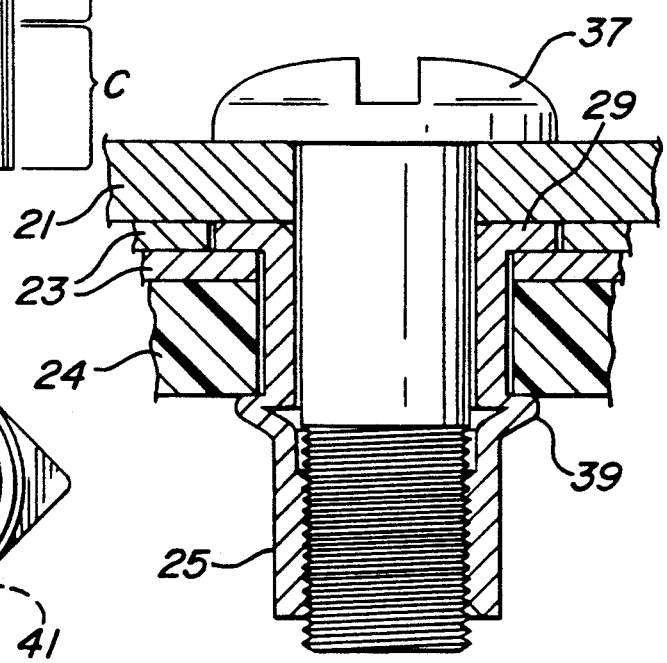

SELF-CLINCHING FASTENER FOR ELECTRICAL COMPONENTS

FIELD OF THE INVENTION

This invention relates to a fastener and a fastener system for joining panels through aligned apertures and, in particular, metal to plastic assemblies. More specifically, this invention relates to the securing of electrical connector shells to plastic connector housings which are in turn mounted to a panel.

BACKGROUND OF THE INVENTION AND DESCRIPTION OF THE PRIOR ART

The present invention is a new design for an internally threaded fastener. It is similar to other fasteners, called "rivet nuts", because it includes characteristics of both a rivet and a nut. Parts to be joined become trapped (riveted) between the head and the collapsible middle portion of the fastener shank which bulges radially outward, being deformed by compression as a screw threaded into the fastener shank is tightened. Later, other parts may be joined to the riveted subassembly by a headed screw driven into the fastener's internal threads. An example of this type of fastener is disclosed in U.S. Pat. No. 5,065,283 issued to Adachi et al. This reference shows leads of a busbar attached to a circuit board with the use of a rivet nut type fastener.

The specific application to which the present invention is most advantageously applied is in the circuit board component assembly arts. U.S. Pat. No. 4,911,659 issued to Viselli shows the use of metal retaining brackets to affix a plastic connector housing to a circuit board. The mounting brackets disclosed in this patent include metal shanks which are peened over to secure mounting ears of the housing to the bracket. In modern practice, however, separate mounting brackets are eliminated in favor of connector housings (made of plastic) with mounting brackets molded into the body of the housing. This creates new problems for fasteners used in the electrical connector assembly, since the connector fasteners now must be applied directly to a plastic part, rather than a metal bracket.

Greater background of the specific application of the present invention described above is shown in FIG. 1 which depicts a prior art electrical connector assembly utilizing fasteners applied directly to a plastic housing. Housing 11 includes molded-in brackets which provide mounting points to both the printed circuit board and the connector assembly. The electrical connector assembly includes interlocking shells 13a and 13b which are joined to the vertical portions of the housing mounting brackets by the use of internally threaded fasteners 17. Jack screws 19 secure panel 15 to the assembly and provide securement for the electrical connector plug, which is not shown in this figure. Female fasteners 17 are affixed to housing brackets 10 by broaching the shanks into the plastic material around the bracket apertures.

While this method creates a simplified assembly, it poses production problems and limitations upon the connector fasteners. For example, many of the housings become damaged when the fasteners are broached into the plastic part. Furthermore, the pullout resistance of the fasteners is limited by the inherent weakness of the broached plastic. Also, the fasteners need to be relatively short because of the broach insertion and this limits the amount of threads in the fastener bore. Lastly, when removing the connector assembly from a mounting panel, the jack screw often turns with the mating cable end connector and the board-mounted connector can accidentally become disassembled.

There is therefore a need in the art for a fastener and fastening system for joining metal and plastic parts which provides a strong joinder of parts without damage to the plastic element. Furthermore, there is need for such a fastener which also includes self-locking threads.

SUMMARY OF THE INVENTION

These needs in the art of electrical connector fastening described above have been solved by the use of the novel fastener of the present invention. The present fastener functions much in the same way as a rivet nut, except that it includes a shoulder underneath the head and further includes a stepped internal bore. These structures cause the fastener to predictably bulge at a desired location along the outside of the fastener shank, regardless of the strength or thickness of the material which it joins. Another important feature of this construction is that the fastener can be installed by a simple pressing between two flat surfaces. Prior art rivet nuts require a central arbor shaft in the bore to prevent the bulge portion of the shank from collapsing inward.

It is not heretofore known to use rivet nut type fasteners in plastic parts, because the plastic material is insufficient to support the shank which tends to bulge into the inner wall of the plastic, rather than at the desired point behind the backside of the plastic part. Thus, the plastic part often becomes damaged. With the present invention, however, it has been found that plastic parts may be joined with little or no damage because the part is protected by the strength of the shoulder, yet it is firmly captured in compression between the bulge and the head of the fastener.

More specifically, the present invention is an internally threaded fastener with three portions along its length: a top portion, including a head and a shoulder directly underneath the head which extends along the outside of the fastener shank a distance equivalent to the widths of the parts to be joined; a thin-walled, bulge portion which is deformed by axial compression of the fastener so that the shank collapses and expands radially in the bulge area; and a bottom portion, which includes an internally threaded bore for receiving a screw which affixes the housing subassembly to a supporting panel. When using this fastener with a plastic part, the length of the fastener is not restricted. Hence, the shank beyond the shoulder may extend whatever distance is necessary to provide sufficient shank area for the bulge and also to provide whatever amount of threads are desired in the bottom portion.

The fastener further includes a through-bore which is stepped. The bore through the head and the bulge portion of the shank steps down to a smaller diameter at the end of the middle bulge portion. The smaller diameter continues through the threaded bottom end of the fastener. This construction creates a thinner wall of material along the middle bulge portion of the shank than exists at either end of the fastener. Therefore, when compressed, the fastener repeatedly bulges at its weakest point which lies just beyond the shoulder. The ability to control the bulge point in this way makes it possible to apply this fastener to plastic parts without damage. Furthermore, because the length of the fastener is not limited, the internal threaded portion at the bottom end of the fastener may be squeezed into a non-circular shape with enough threads to apply sufficient grip to provide a locking thread for the inserted screw.

Thus, the present invention provides a superior fastening system for metal to plastic parts, such as electrical connectors to plastic circuit board mounted housings. This fastener may be applied to the plastic housings without damage and also provide the feature of a locking thread. This latter feature of the present invention is important because it provides a prevailing torque to an inserted jack screw (see FIG. 1) to prevent it from being loosened when the connector plug screw is removed.

The present invention provides an extremely strong joinder of the electrical connector assembly since it applies no tensile loads to the plastic which is mechanically stronger when loaded in compression. When used with non-insulating materials, this fastener also provides electrical continuity through the connector so that the metal parts are electrically grounded. Furthermore, this fastener keeps the connector assembled, whether or not a screw is present in the fastener. Also, it adapts to minor variations in connector thickness. Other advantages will be apparent to those of ordinary skill in the art from the following drawings and description of the preferred embodiment.

BRIEF DESCRIPTION OF THE DRAWINGS

FIG. 1 is a front view showing a connector shell mounted to a panel utilizing the present invention.

FIG. 2 is a top front isometric view of the present invention in isolation.

FIG. 3 is a partial side-sectional view of the present invention with three major portions of the invention labeled A, B, and C.

FIG. 4 is a top view of the present invention.

FIG. 5 is a side sectional view taken from FIG. 1 as shown in that figure.

DESCRIPTION OF THE PREFERRED EMBODIMENT

Figure 6:
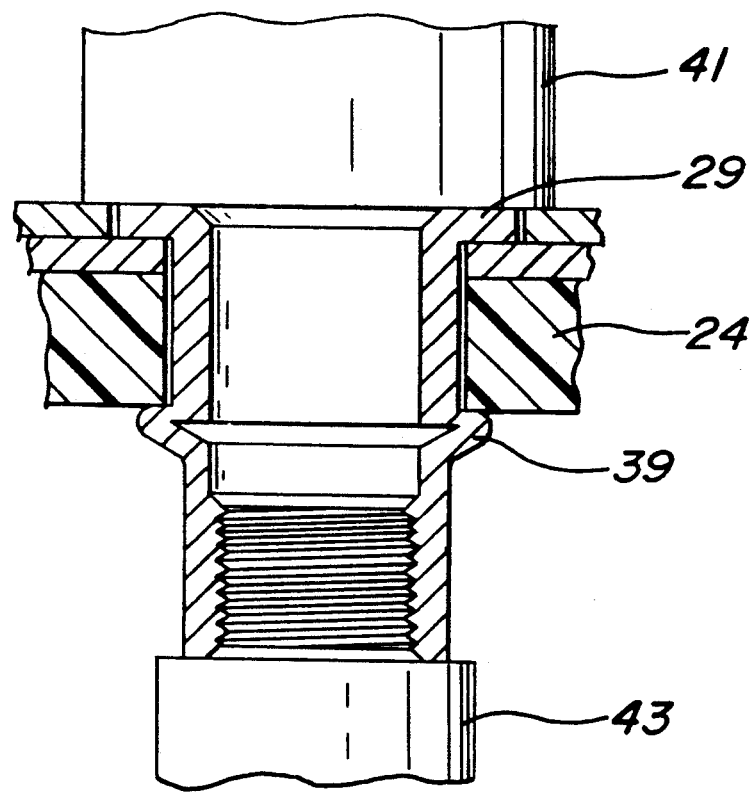
FIG. 6 is a side sectional view showing the present fastener being installed.

Referring now to FIG. 1, electrical connector shells 23 are mounted to panel 21 by screw-means 27. The fastener of the present invention 25 is positioned in the connector shell and attaches the shell to housing 24 by riveting the parts between the head and the central bulge. The square head of the fastener fits into a like recess in the shell to provide torque resistance between the shell and the fastener. Fastener 25 also provides internal thread means shown in FIG. 3 for receiving a screw, such as screw 27 which secures the sub-assembly to panel 21.

Referring now to FIG. 2, the fastener of the present invention is shown in isolation. The fastener includes a square head 29 and an internal through-bore 31. Below the head is a shoulder 33 which has a length equal to the width of the parts to be captured between the head and the bulge. Shank 35 extends from the top of the shoulder to the bottom end of the fastener. The diameter of the shoulder is suitably sized for insertion into the aligned apertures of the connector subassembly. The square head fits into a like recess in the outer shell of the connector assembly as shown in FIG. 5.

Referring now to FIG. 3, the fastener of the present invention may be further described by dividing the length of the shank into three portions: a top portion (A), including a head and a shoulder directly below the head which extends along the outside of the fastener shank a distance equal to the total width of the parts to be joined; a thin-walled, middle bulge portion (B), which is deformed by axial compression of the fastener so that the shank expands radially in this area; and a bottom portion (C), which includes an internally threaded bore for receiving a screw which affixes the housing to a supporting panel. An internal bore 31 passes through all portions of the fastener and steps down from a larger diameter to a smaller diameter at the point between the middle bulge portion and the bottom threaded portion. It can be seen from this view that the middle bulge portion (B) represents the portion of the shank which has the thinnest outer wall; hence, it is mechanically the weakest point along the fastener shank and, hence, bulges first under axial compression as more clearly shown as feature 39 in FIG. 5.

Referring now to FIG. 4, a top view of the present invention is shown. As shown in this figure, circular bore 31 has been distorted in the area of the threaded portion 41 of the fastener. This is accomplished by a simple diametric compression of the shank which deforms the circularity of the threads. It will be readily understood that this will create a self-locking resistance for a screw threaded into the fastener as more clearly shown in FIG. 5.

Referring now to FIG. 5, a completed assembly of parts is shown. The fastener of the present invention 25 shown in this figure has been compressed so that bulge 39 has trapped, and thus joined, connector shells 23 and housing 24 against the fastener head 29. The separate connector shells are interlocked by other fastening means not shown. It will be understood that this compression (riveting) of the fastener as shown in FIG. 6 to join these parts is done prior to installing screw 27 which later affixes the sub-assembly of parts to panel 21.

Referring now to FIG. 6, the present invention is shown being clinched into the shell/housing sub-assembly. The sub-assembly is clinched between head 29 and bulge portion 39 by simple axial compression of the fastener, as for example between ram 41 and anvil 43. As described above, the structure of the fastener makes the outward bulge 39 occur repeatedly at a point just behind the shoulder and, thus, the fastener may be applied to relatively soft materials, such as plastic housing 24. This avoids the possibility that the material might bulge within the inner wall of the housing, thus damaging the part. It further eliminates the need for aligning the part with a central arbor shaft on the anvil or ram to prevent the walls of the fastener from collapsing inward. This is a critical aspect of the present invention which greatly enhances its ease of installation, since simple flat surfaces of the compressing elements are sufficient.

From the foregoing description of the preferred embodiment, it will be apparent that the objects and advantages to fulfill the above-described needs in the art have been met. The fastener of the present invention provides superior performance and lack of damage to plastic parts. Furthermore, a self-locking feature is economically incorporated without the need for additional parts. Thus, the fastener of the present invention is both economical to produce and to employ since it is a major labor-saving fastening system with only two parts.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. An assembly of parts including a fastener having a head, an elongate shank, and a threaded through-bore, comprising:
    a top portion along the length of the shank, including a head at the top and a shoulder extending axially along the shank;
    a middle bulge portion of reduced outside diameter beginning at the end of said shoulder prior to deformation and having the least wall thickness of all remaining portions of the fastener;
    a bottom portion which is internally threaded, the outer circumference of said bottom portion and said middle portion being equal prior to deformation, but less than the outer circumference of said shoulder;
    a through-bore being of one diameter prior to deformation along said top and middle portions and having a smaller diameter in said threaded bottom portion, said bottom portion of said fastener has been diametrically compressed to distort the circularity of the threads, whereby said distorted threads provide a prevailing torque to a screw inserted into said threads;
    a bulge caused by deformation of the shank at the end of the shoulder;
    said fastener being inserted into aligned apertures of at least two parts and then axially compressed by external forces applied only to the top and bottom ends of said fastener, whereby said parts are held together between the head and said bulge, thus creating a united subassembly of parts.

2. The assembly of claim 1, wherein the length of said shoulder is equivalent to the width of the parts to be joined.

3. The assembly of claim 2, which is joined to a panel by screw means threaded into the bottom portion of said fastener.

4. The assembly of claim 3, wherein one of the parts of said subassembly is composed of plastic.

5. The assembly of claim 4, wherein said plastic part is an electrical connector housing and another of said parts is a metallic electrical connector shell.

6. The assembly of claim 3, further including means on the head of the fastener to engage one of said parts to provide torsional resistance between the said one part and the fastener.

7. The assembly of claim 6, in which the fastener of said assembly of parts is axially compressed between an anvil and a ram, both having only flat planar faces.

* * * * *